US011888155B1

(12) United States Patent
Lee et al.

(10) Patent No.: US 11,888,155 B1
(45) Date of Patent: Jan. 30, 2024

(54) CATHODE FOR LITHIUM SECONDARY BATTERY AND LITHIUM SECONDARY BATTERY INCLUDING THE SAME

(71) Applicant: SK ON CO., LTD., Seoul (KR)

(72) Inventors: Jong Hyeok Lee, Daejeon (KR); Hyun Ji Kim, Daejeon (KR); Yoon Ji Jo, Daejeon (KR); Chang Mook Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/446,476

(22) Filed: Aug. 9, 2023

(30) Foreign Application Priority Data

Dec. 15, 2022 (KR) .................. 10-2022-0176319
May 9, 2023 (KR) .................. 10-2023-0059772

(51) Int. Cl.
*H01M 4/36* (2006.01)
*H01M 4/131* (2010.01)
*H01M 4/505* (2010.01)
*H01M 4/525* (2010.01)
*H01M 10/0525* (2010.01)
*H01M 4/02* (2006.01)

(52) U.S. Cl.
CPC .......... *H01M 4/366* (2013.01); *H01M 4/131* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2011/0168550 A1* 7/2011 Wang ............... H01M 4/131
204/290.01
2015/0255786 A1* 9/2015 Hashimoto ........... H01M 4/139
429/233
2022/0093916 A1  3/2022 Yao et al.

FOREIGN PATENT DOCUMENTS

KR  10-2015-0024703 A  3/2015
KR  10-2017-0093085 A  8/2017
KR  10-2021-0012755 A  2/2021

* cited by examiner

*Primary Examiner* — Gregg Cantelmo
(74) *Attorney, Agent, or Firm* — IP & T GROUP LLP

(57) ABSTRACT

A cathode for a lithium secondary battery includes a cathode current collector, and a cathode active material layer including a plurality of active material layers sequentially disposed on the cathode current collector which include different types of cathode active material particles from each other. $D_A$ determined by the present disclosure of an active material layer closest to the cathode current collector among the plurality of active material layers is 0.5 μm or less.

19 Claims, 3 Drawing Sheets

CATHODE FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2022-0176319 filed on Dec. 15, 2022 and No. 10-2023-0059772 filed on May 9, 2023 in the Korean Intellectual Property Office (KIPO), the entire disclosure of which is incorporated by reference herein.

BACKGROUND

1. Field

The present disclosure relates to a cathode for a lithium secondary battery and a lithium secondary battery including the same. More particularly, the present disclosure relates to a cathode for a lithium secondary battery including different types of cathode active materials and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, various battery packs including a plurality of secondary batteries are being developed and applied as eco-friendly power source of electric automobiles, hybrid vehicles, and the like.

Examples of the secondary battery includes, e.g., a lithium secondary battery, a nickel-cadmium battery, a nickel-hydrogen battery, etc. The lithium secondary battery is actively developed and applied due to its high operational voltage and energy density per unit weight, high charging rate, and compact dimension. An example of a typical lithium secondary battery may include an electrode assembly including a cathode, an anode and a separation layer (separator) interposed therebetween, and an electrolyte immersing the electrode assembly.

The cathode may include a cathode current collector and a cathode active material layer formed on the cathode current collector. The cathode active material layer may include a lithium metal oxide as a cathode active material.

For example, lithium cobalt oxide ($LiCoO_2$), lithium nickel oxide ($LiNiO_2$), lithium manganese oxide ($LiMnO_2$, $LiMn_2O_4$, etc.), lithium iron phosphate ($LiFePO_4$), an NCM based lithium metal oxide containing nickel, cobalt and manganese, an NCA-based lithium metal oxides containing nickel, cobalt and aluminum, etc., are used as the cathode active material.

As the application range of lithium secondary batteries is being expanded, extended life-span, higher capacity and higher energy density are required. However, when the lithium metal oxide is designed to have more increased energy density, capacity and power, stability and capacity retention from the lithium metal oxide may be lowered. Hence, new solutions are needed for meeting the market demand for improved lithium secondary batteries.

SUMMARY

According to an aspect of the present disclosure, there is provided a cathode for a lithium secondary battery having improved operational and chemical stability.

According to another aspect of the present disclosure, there is provided a lithium secondary battery having improved operational and chemical stability.

A cathode for a lithium secondary battery includes a cathode current collector, and a cathode active material layer including a plurality of active material layers sequentially disposed on the cathode current collector which include different types of cathode active material particles from each other. An active material layer closest to the cathode current collector among the plurality of active material layers has a $D_A$ of 0.5 µm or less. In a 3D model of each active material layer showing a distribution of the cathode active material particles included in each active material layer, $D_A$ is an arithmetic average value of top 100 diameters of spheres when paths extending between the cathode active material particles and passing through both surfaces of the 3D model in a thickness direction are analyzed, a maximum diameter of a sphere capable of passing through each path is measured, and the diameters of the spheres are listed in a descending order.

In some embodiments, the cathode active material layer may satisfy Equation 1 below.

$$0 \leq |D_{A1} - D_{A2}|/D_{A1} \leq 4.4 \qquad \text{[Equation 1]}$$

In Equation 1, $D_{A1}$ and $D_{A2}$ are $D_A$ values of active material layers neighboring each other among the plurality of active material layers.

In some embodiments, the cathode active material layer may include a first active material layer on the cathode current collector and a second active material layer on the first active material layer. The first active material layer may include first cathode active material particles and may have a $D_A$ of 0.5 µm or less. The second active material layer may include second cathode active material particles different from the first cathode active material particles.

In some embodiments, the $D_A$ of the first active material layer may be in a range from 0.3 µm to 0.5 µm.

In some embodiments, a $D_A$ of the second active material layer may be in a range from 0.5 µm to 2 µm.

In some embodiments, the $D_A$ of the first active material layer may be less than or equal to $D_A$ of the second active material layer.

In some embodiments, a ratio of the $D_A$ of the second active material layer relative to the $D_A$ of the first active material layer may be in a range from 1 to 5.

In some embodiments, a $L_A$ of the first active material layer may be 60 µm or more. In a 3D model of each active material layer showing a distribution of the cathode active material particles included in each active material layer, $L_A$ is an arithmetic average value of lengths of top 100 paths when paths extending between the cathode active material particles and passing through both surfaces of the 3D model in a thickness direction are analyzed, a maximum diameter of a sphere capable of passing through each path is measured, and the paths are listed in a descending order of the diameters of the spheres.

In some embodiments, the $L_A$ of the first active material layer may be in a range from 60 µm to 70 µm.

In some embodiments, a $L_A$ of the second active material layer may be 65 µm or less.

In some embodiments, the $L_A$ of the first active material layer may be greater than or equal to the $L_A$ of the second active material layer.

In some embodiments, a ratio of the $L_A$ of the second active material layer relative to the $L_A$ of the first active material layer may be in a range from 0.8 to 1.0.

In some embodiments, the first cathode active material particles may have a shape of a single particle, and the second cathode active material particles may have a shape of a secondary particle in which a plurality of primary particles are aggregated.

In some embodiments, an average particle diameter $D_{50}$ of the first cathode active material particles may be smaller than an average particle diameter $D_{50}$ of the second cathode active material particles.

In some embodiments, the average particle diameter $D_{50}$ of the first cathode active material particles may be in a range from 1 μm to 7 μm, and the average particle diameter $D_{50}$ of the second cathode active material particles may be in a range from 9 μm to 20 μm.

In some embodiments, the cathode active material layer may further include a conductive material and a binder, and a content of the cathode active material particles may be in a range from 85 wt % to 98 wt % based on a total weight of the cathode active material layer.

In some embodiments, a density of the cathode active material layer may be in a range from 3.5 g/cc to 3.7 g/cc.

A lithium secondary battery includes the cathode for a lithium secondary battery according to the above-described embodiments, and an anode facing the cathode.

A cathode for a lithium secondary battery includes a cathode current collector; and a plurality of active material layers stacked on the cathode current collector, wherein at least two of the plurality of the active material layers comprise different cathode active material particles. An active material layer which is in contact with the cathode current collector has a $D_A$ of 0.5 μm or less, According to embodiments, a cathode active material layer may have a multi-layered structure including at least two active material layers, and each of the active material layers may include different types of cathode active material particles. Both power and life-span properties may be improved by including heterogeneous cathode active material particles in the cathode active material layer.

In the active material layers, the $D_A$ and $L_A$ defined as will be described later may satisfy a predetermined range, so that high-temperature storage and life-span properties may be improved.

A cathode active material particle having a single particle shape may be included in a lower layer to improve high-temperature storage and high-temperature stability. A cathode active material particle having a secondary particle shape may be included in an upper layer to improve life-span and low-resistance properties.

DETAILED DESCRIPTION OF THE EMBODIMENTS

According to embodiments of the present disclosure, a cathode for a lithium secondary battery including different types of cathode active material particles and including a multi-layered cathode active material later is provided.

Further, a lithium secondary battery including the cathode is also provided.

The terms "first", "second", "third", "upper side", "lower side", "upper side", "lower side" used herein are not intended to an absolute position or an order, but are used relatively to distinguish different regions, levels or elements.

Cathode for Lithium Secondary Battery

Figure 1:
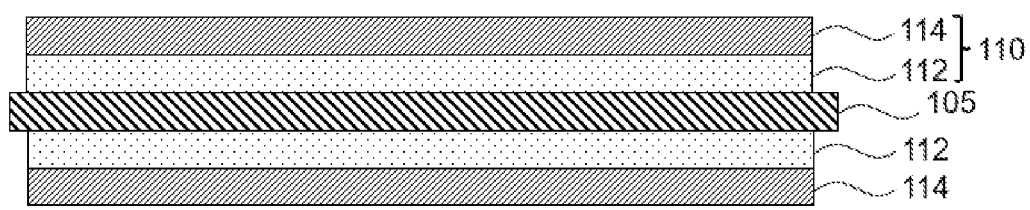
FIG. 1 is a schematic cross-sectional view of a cathode for a lithium secondary lithium battery in accordance with embodiments.

FIG. 1 is a schematic cross-sectional view of a cathode for a lithium secondary lithium battery in accordance with example embodiments.

Referring to FIG. 1, a cathode 100 for a lithium secondary battery may include a cathode current collector 105 and a cathode active material layer 110 formed on the cathode current collector 105.

For example, the cathode active material layer 110 may be formed on one surface or both surfaces of the cathode current collector 105.

For example, the cathode current collector 105 may include stainless steel, nickel, aluminum, titanium, copper, or an alloy thereof.

The cathode active material layer 110 may have a multi-layered structure. For example, the cathode active material layer 110 may include a plurality of active material layers sequentially stacked from the cathode current collector 105.

For example, the cathode active material layer 110 may include a first active material layer 112 formed on the cathode current collector 105 and a second active material layer 114 formed on the first active material layer 112.

For example, the first active material layer 112 may be in contact with the cathode current collector 105, and the second active material layer 114 may be in contact with the first active material layer 112.

Each of the active material layers 112 and 114 may include cathode active material particles capable of reversibly intercalating and de-intercalating lithium ions.

In embodiments, the active material layers 112 and 114 may include different types of cathode active material particles. For example, the cathode active material particles included in the first active material layer 112 and the cathode active material particles included in the second active material layer 114 may be structurally, morphologically or compositionally different.

In embodiments, a $D_A$ of the active material layer closest to the cathode current collector 105 among the plurality of active material layers (e.g., the first active material layer 112) may be 0.5 μm or less.

In a 3D model of each active material layer showing a distribution of the cathode active material particles included in each active material layer, $D_A$ is an arithmetic average value of top 100 diameters of spheres when paths extending between the cathode active material particles passing through both surfaces of the 3D model in a thickness direction are analyzed, a maximum diameter of a sphere capable of passing through each path is measured, and the diameters of the spheres are listed in a descending order.

When the $D_A$ of the first active material layer 112 disposed at the lowermost level of the cathode active material layer 110 is 0.5 μm or less, an ion penetration path or conduction path in the first active material layer 112 may become increased. Thus, when charging and discharging at a high rate, a reaction may be concentrated in the active material layer positioned above the first active material layer 112, and damages to the first active material layer 112 may be prevented.

For example, if the $D_A$ is 0.5 μm or more, the reaction may occur in the first active material layer 112 in advance and the first active material layer 112 may be damaged or a resistance may be increased. Accordingly, the cathode active material adjacent to the current collector may be damaged, and high rate, rapid charge/discharge and storage properties of the secondary battery may be deteriorated.

In some embodiments, the $D_A$ of the first active material layer 112 may be greater than or equal to 0.3 μm. For example, the $D_A$ of the first active material layer 112 may be 0.35 μm or more, or 0.4 μm or more.

In some embodiments, the $D_A$ of the first active material layer 112 may be 0.5 μm or less, less than 0.5 μm, or 0.45 μm or less. For example, in the first active material layer 112, the $D_A$ may be 0 μm<$D_A$≤0.5 μm, 0.3 μm≤$D_A$≤0.5 μm, 0.35 μm≤$D_A$≤0.5 μm, 0.35 μm≤$D_A$≤0.45 μm, or 0.4 μm≤$D_A$≤0.5 μm.

For example, if the $D_A$ is less than 0.3 μm, charge/discharge efficiency of the lithium secondary battery may be relatively lowered. For example, as the $D_A$ becomes smaller, a movement path and a conductive path of the lithium ions may be increased, and rapid charging performance and power properties may be degraded.

In embodiments, a $D_A$ of an uppermost active material layer among the plurality of active material layers (e.g., the second active material layer 114) may be 0.5 μm or more.

In the above $D_A$ range of the second active material layer 114, the lithium ion path may be shortened and charge/discharge of the second active material layer 114 may preferentially occur. Accordingly, deterioration and damages of the first active material layer 112 may be prevented, and high-rate discharge, rapid charging performance and life-span properties of the secondary battery may be improved.

In some embodiments, the $D_A$ of the second active material layer 114 may be 2 μm or less. For example, in the second active material layer 114, the $D_A$ may be 0.5 μm≤$D_A$≤2 μm, 0.5 μm≤$D_A$≤1.9 or 1.0 μm≤$D_A$≤1.8 Within the above range, cracks of particles may be suppressed while maintaining high power properties of the second active material layer 114, and the life-span and the storage stability of the lithium secondary battery may be improved.

In some embodiments, the cathode active material layer 110 may satisfy Equation 1 below.

$$0 \le |D_{A1}-D_{A2}|/D_{A1} \le 4.4 \quad \text{[Equation 1]}$$

In Equation 1, $D_{A1}$ and $D_{A2}$ may be $D_A$ values of active material layers adjacent to each other among a plurality of the active material layers. For example, when $D_{A1}$ is the $D_A$ value of the first active material layer 112, $D_{A2}$ may be the $D_A$ value of the second active material layer 114.

As a deviation of the $D_A$ values between the adjacent active material layers 112 and 114 increases, structural stability of the cathode active material layer 110 may be deteriorated. Furthermore, as a difference of electrochemical properties between the active material layers 112 and 114 increases, the power of the cathode active material layer 110 may be reduced by, e.g., the active material layer having the lowest power properties.

For example, in the active material layers adjacent to each other in the cathode active material layers 110, 0.1≤|$D_{A1}$−$D_{A2}$|/$D_{A1}$≤4.4, 0.1≤|$D_{A1}$−$D_{A2}$|/$D_{A1}$≤4.0, or 0.2≤|$D_{A1}$−$D_{A2}$|/$D_{A1}$≤3.5.

In embodiments, the $D_A$ of the first active material layer 112 may be less than or equal to the $D_A$ of the second active material layer 114. In an embodiment, the $D_A$ of the first active material layer 112 may be smaller than $D_A$ of the second active material layer 114.

In an embodiment, a ratio of the $D_A$ of the second active material layer 112 relative to the $D_A$ of the first active material layer 114 may be from 1 to 5, greater than 1 and less than or equal to 5, from 1.2 to 5, from 1.2 to 4.9, or from 1.2 to 4.5. The first active material layer 112 adjacent to the cathode current collector 105 may have a relatively low $D_A$, so that the reaction may preferentially occur in the second active material layer 114, and the life-span and high rate properties may be improved. Additionally, the second active material layer 114 relatively adjacent to an electrolyte may have greater $D_A$, the rapid charging and life-span properties of the entire cathode active material layer may be improved.

In embodiments, the active material layer closest to the cathode current collector 105 among the plurality of active material layers (e.g., the first active material layer 112) may have a $L_A$ of 60 μm or more.

In a 3D model of each active material layer 112 and 114 showing a distribution of the cathode active material particles included in each active material layer 112 and 114, $L_A$ is an arithmetic average value of lengths of top 100 paths when the paths extending between the cathode active material particles passing through both surfaces of the 3D model in a thickness direction are analyzed, a maximum diameter of a sphere capable of passing through each path is measured, and the paths are listed in a descending order of the diameters of the spheres.

As the $L_A$ of the active material layer becomes smaller, a conductivity may be increased to react preferentially during charging and discharging of the secondary battery. In embodiments, the $L_A$ of the first active material layer 112 may be greater than or equal to 60 μm, so that capacity of the lithium secondary battery may be increased and the power properties may be improved.

In some embodiments, the $L_A$ of the first active material layer 112 may be 70 μm or less, for example 68 μm or less, or 67 μm or less.

In some embodiments, in the first active material layer 112, 60 μm≤$L_A$≤70 μm, 65 μm≤$L_A$≤68 μm, or 65.1 μm≤$L_A$≤67 μm.

In embodiments, a $L_A$ of the uppermost active material layer among the plurality of the active material layers (e.g., the second active material layer 114) may be 65 μm or less.

The second active material layer 114 may have a relatively small $L_A$ and has relatively high conductivity, and thus the reaction with lithium ions may preferentially occur in the second active material layer 114. Accordingly, damages to the first active material layer 112 positioned at a lower level may be suppressed, and the structure of the first active material layer 112 may be stably maintained even during repeated charging and discharging. Additionally, intercalation and deintercalation of lithium ions may occur preferentially in the second active material layer 114 adjacent to the electrolyte, so that the high rate and rapid charging properties may be improved.

In some embodiments, the $L_A$ of the second active material layer 112 may be 64.5 μm or less, e.g., 60 μm or less, or 59 μm or less.

In some embodiments, the $L_A$ of the second active material layer 112 may be 48 μm or more, 49 μm or more, or 50 μm or more. For example, in the second active material layer 112, 48 μm≤$L_A$≤65 μm, 49 μm≤$L_A$≤65 μm, or 50 μm≤$L_A$≤64.5 μm.

In the above range of the $L_A$ of the second active material layer 112, side reactions due to a contact between the cathode active material particles and the electrolyte may be suppressed, and particle damages and irreversible decomposition of the electrolyte may be prevented. Thus, the life-span properties of the lithium secondary battery may be further improved.

In some embodiments, the cathode active material layer 110 may satisfy Equation 2 below.

$$0 \leq |L_{A1} - L_{A2}|/L_{A1} \leq 0.15 \quad \text{[Equation 2]}$$

In Equation 2, $L_{A1}$ and $L_{A2}$ are $L_A$ values of active material layers adjacent to each other among the plurality of the active material layers. For example, when $L_{A1}$ is the $L_A$ value of the first active material layer 112, $L_{A2}$ may be the $L_A$ value of the second active material layer 114.

In embodiments, the $L_A$ of the second active material layer 114 may be less than or equal to the $L_A$ of the first active material layer 112. In an embodiment, the $L_A$ of the second active material layer 114 may be smaller than the $L_A$ of the first active material layer 112.

In an embodiment, a ratio of the $L_A$ of the second active material layer 114 relative to the $L_A$ of the first active material layer 112 may be 1 or less, and may be, e.g., in a range from 0.8 to 1, 0.8 or more and less than 1, from 0.85 to 1, or 0.85 or more and less than 1.

The first active material layer 112 adjacent to the cathode current collector 105 may have a relatively high $L_A$, so that the life-span properties of the lithium secondary battery may be improved. Additionally, the second active material layer 114 adjacent to the electrolyte may have a relatively low $L_A$, so that the power and rapid charging propertied of the lithium secondary battery may be improved.

Figure 2:
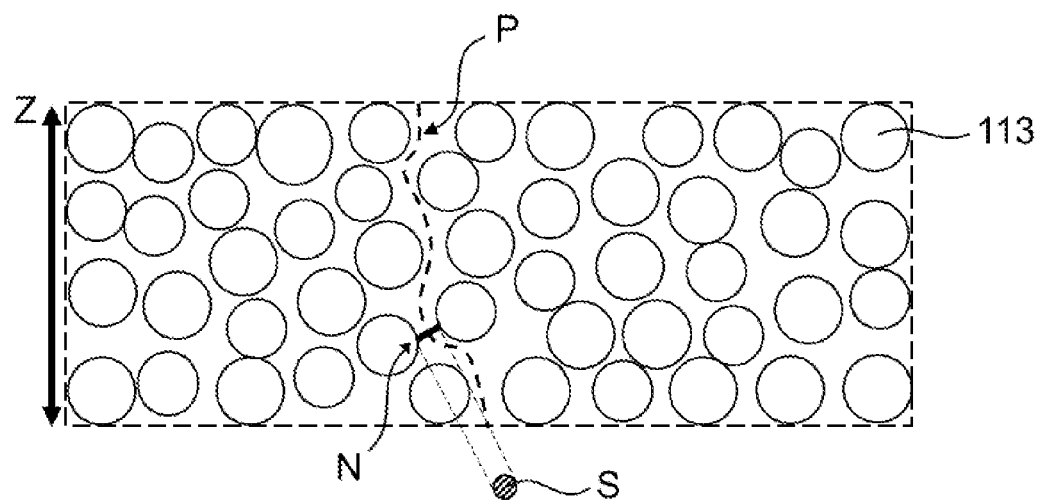
FIGS. 2 and 3 are schematic 2-dimensional cross-sectional view illustrating a distribution of cathode active material particles in a cathode active material of a cathode for a lithium secondary lithium battery in accordance with embodiments.

FIG. 2 is a cross-sectional diagram for describing a distribution of cathode active material particles 113, and the $D_A$ and the $L_A$ in the first active material layer 112. For convenience of descriptions, a two-dimensional cross-sectional diagram is provided in FIG. 2.

In FIG. 2, the first active material layer 112 is illustrated for convenience of descriptions, but the descriptions in FIG. 2 can also be applied to the second active material layer 114 and other active material layers.

Referring to FIG. 2, the cathode active material particles 113 of the first active material layer 112 may be distributed in contact with each other or spaced apart from each other. Accordingly, a path (P in FIG. 2) extending between the cathode active material particles 113 and passing through both surfaces of the active material layer 112 in a thickness direction (Z-direction in FIG. 2) may be formed. It should be understood that a plurality of such paths may be formed in the first active material layer 112.

For each path, a maximum size through which of a sphere (sphericity 1) can pass may be analyzed. For example, in FIG. 2, the maximum size of the sphere that can pass through the path P may be determined by N that is the narrowest neck. That is, the maximum size of the sphere that can pass through the path P may be S.

The $D_A$ may correspond to an arithmetic average value of top 100 values when the S of each path is listed in a descending order of the maximum diameter of the sphere. The $L_A$ may correspond to an arithmetic average value of lengths of top 100 paths when the paths are arranged in a descending order of the diameter of the S.

Figure 3:
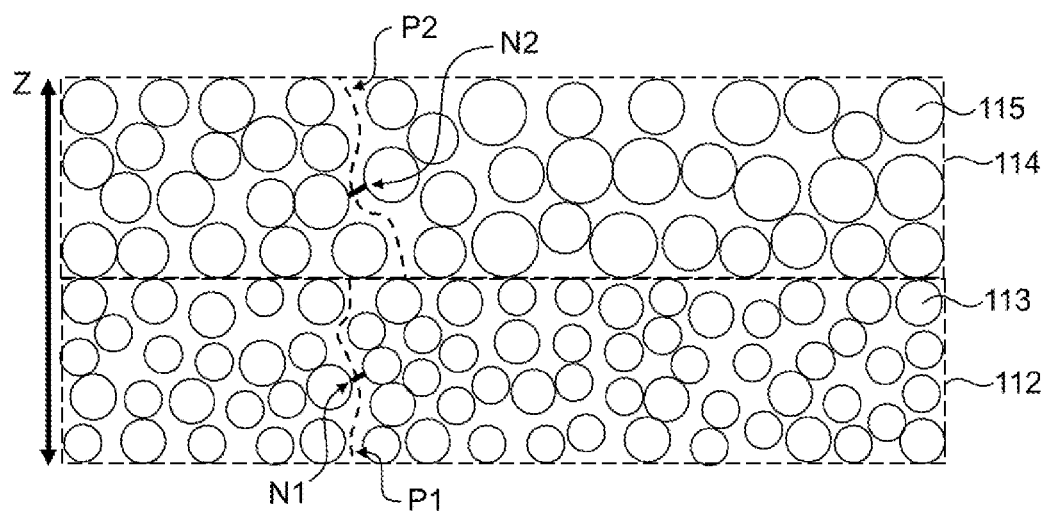

FIG. 3 is a two-dimensional cross-sectional diagram for describing distributions of cathode active material particles 113 and 115 included in the first active material layer 112 and the second active material layer 114, and the $D_A$ and $L_A$.

Referring to FIG. 3, a plurality of paths P1 may be formed in the first active material layer 112 extending between the cathode active material particles 113 and passing through both surfaces of the first active material layer 112 in the thickness direction. A maximum size of sphere S1 that can pass through each path can be determined by N1 that is the narrowest neck of each path.

$D_A$ of the first active material layer 112 may correspond to an arithmetic average value of the top 100 S1s of the paths P1 when the S1s of the paths P1 are arranged in a descending order. The $L_A$ of the first active material layer 112 may correspond to an arithmetic average value of lengths of the top 100 paths P1 when the paths P1 are arranged in a descending order of the diameters of the S1s.

Further, a plurality of paths P2 may be formed in the second active material layer 114 extending between the cathode active material particles 115 and passing through both surfaces of the second active material layer 114 in the thickness direction. A maximum size of a sphere S2 that can pass through each path can be determined by N2 that is the narrowest neck of each path.

The $D_A$ of the second active material layer 114 may correspond to an arithmetic average value of the top 100 S2s when S2s of the paths P2 are arranged in a descending order. The $L_A$ of the second active material layer 114 may correspond to an arithmetic average value of lengths of the top 100 paths P2 when the paths P2 are arranged in a descending order of the diameters of S2s.

For example, the $D_A$ and $L_A$ may be determined by various factors such as particle sizes and contents of cathode active material particles, sizes and contents of conductive materials, sizes and contents of binder in the cathode active material layers, a thickness and a density of each active material layer, etc.

For example, $D_A$ and $L_A$ may be adjusted according to a shape of cathode active material particles present in each of the active material layers 112 and 114, a degree of dispersion or uniformity of the particles, etc. For example, as particles of a large particle size and particles of a small particle size are uniformly mixed, a packing property between lithium metal oxide particles may increase and the $D_A$ and $L_A$ of the active material layers 112 and 114 may be adjusted.

Further, an area occupied by the particles in the active material layers 112 and 114 may be changed by the conductive material or the binder, and thus the $D_A$ and $L_A$ may be adjusted. For example, a distance between the particles may increase as much as a space occupied by the conductive material or the binder, and a binding degree between the particles may vary depending on the binder, so that the $D_A$ and $L_A$ of the active material layers 112 and 114 may be adjusted.

Additionally, the $D_A$ and $L_A$ may be controlled by the thickness and the density of the active material layers 112 and 114. For example, as the thickness of the active material layers 112 and 114 increases, $L_A$ may increase as the path passing through both surfaces of the active material layers 112 and 114 becomes longer. As the density of the cathode active material layer decreases, $D_A$ may be decreased.

In embodiments, the first cathode active material particle 113 may have a shape of a single particle morphologically.

In embodiments, the second cathode active material particle 115 may have a shape of a secondary particle shape in which a plurality of primary particles are aggregated, assembled or combined.

For example, the single particle and the secondary particle may be distinguished based on a cross-sectional image of the particle from a scanning electron microscope (SEM).

For example, the secondary particle may refer to a particle that is considered or observed as one particle by aggregation of a plurality of the primary particles. For example, boundaries of the primary particles may be observed in the SEM cross-sectional image of the secondary particle.

For example, in the secondary particle, 10 or more, 30 or more, 50 or more, or 100 or more primary particles may be aggregated.

For example, the single particle may refer to a monolith rather than an aggregate. For example, boundaries of primary particles may not be observed in the SEM cross-sectional image of the single particle.

In an embodiment, fine particles (e.g., particles having a volume of 1/100 or less of a volume of the single particle) may be attached to a surface of the single particle, and the above shape is not excluded from the concept of the single particle.

For example, the single particles may exist in contact with each other. For example, 2 to 10, 2 to 5, or 2 to 3 single particles may exist in contact with each other.

The first active material layer 112 adjacent to the cathode current collector 105 may include particles having the single particle shape, so that the first active material layer 112 may have high thermal stability due to the single particle shape, and the high temperature storage and the life-span properties may be improved.

For example, when the cathode active material particles have the single particle shape, deterioration of the particles may be accelerated by repeated charging and discharging of the secondary battery. Accordingly, an internal resistance of the active material layer may be increased, and the power and cycle properties of the secondary battery may be deteriorated.

In embodiments, the first active material layer 112 may have $D_A$ and $L_A$ values in the above-described range. Thus, the reaction according to charging and discharging may proceed preferentially in the upper active material layer, and deterioration of the first active material layer 112 may be suppressed. Therefore, even though the first active material layer 112 includes the particles having the single particle shape, the power properties may be enhanced and a resistance increase may be suppressed.

In an embodiment, the second cathode active material particles 115 may have the secondary particle shape, so that the resistance of the cathode active material layer 110 may be reduced. For example, the boundaries between the primary particles may serve as a transfer path for lithium ions, thereby improving a lithium ion conductivity and lowering the resistance. Further, the power and capacity of the cathode active material may be improved by the fine-diameter primary particles included in the secondary particle.

Accordingly, the capacity of the cathode active material layer 110 may be increased by the second active material layer 114, and the lithium secondary battery having low resistance and high power properties may be provided.

Additionally, the charging and discharging may occur preferentially in the second active material layer 114 having the relatively high $D_A$, so that high rate, low resistance and rapid charging properties may be further improved from the second cathode active material particles 115.

Further, the second active material layer 114 may have $D_A$ and $L_A$ values within the above-described range, so that side reactions of the particles may be suppressed or long-term stability may be improved. Therefore, even though the second active material layer 114 includes the secondary particles, the capacity of the lithium secondary battery may be maintained for a long period.

In an embodiment, an average particle diameter $D_{50}$ of the first cathode active material particles 113 may be smaller than an average particle diameter $D_{50}$ of the second cathode active material particles 115. The particle size $D_{50}$ may be defined as a particle size at 50% in a volume-based particle size distribution, and may be measured using, e.g., a laser diffraction method (microtrac MT 3000).

In some embodiments, the particle diameter $D_{50}$ of the first cathode active material particle 113 may be greater than 1 μm and less than 9 μm, e.g., may be from 2 μm to 6 μm.

In some embodiments, the particle diameter $D_{50}$ of the second cathode active material particle 115 may be in a range from 9 μm to 20 μm, e.g., may be from 9 μm to 15 μm.

In some embodiments, each of the cathode active material particles may include a compound represented by Chemical Formula 1 below.

$$Li_aNi_xM_bO_2 \qquad \text{[Chemical Formula 1]}$$

In Chemical Formula 1, $0.45 \le x \le 0.94$, $0.95 \le a \le 1.05$ and $0.06 \le b \le 0.55$, and M may include at least one selected from the group consisting of B, Al, Ti, V, Mn, Co, Zn, Y, Nb, Zr, Mo, Sn, Mg, Sr, Ba and W.

The chemical structure represented by Chemical Formula 1 indicates a bonding relationship included in a layered structure or a crystal structure of the cathode active material and does not exclude other additional elements. For example, M may serve as a main active element of the cathode active material. Chemical Formula 1 is provided to express the bonding relationship of the main active elements, and should be understood as a formula encompassing the introduction and substitution of additional elements.

In an embodiment, an auxiliary element for enhancing chemical stability of the cathode active material or the layered structure/crystal structure may be further included in addition to the main active element. The auxiliary element may be incorporated into the layered structure/crystal structure to form a bond, and this case is also included within the chemical structure represented by Chemical Formula 1.

The auxiliary element may include, for example, at least one selected from the group consisting of Na, Ca, Hf, Ta, Cr, Fe, Cu, Ag, Ga, C, Si, Ra, P and S. The auxiliary element may act as an auxiliary active element contributing to the capacity/power activity of the cathode active material together with, e.g., Co, Ni, or Mn.

In an embodiment, the cathode active material layer 110 may further include a conductive material and a binder. For example, each of the first active material layer 112 and the second active material layer 114 may further include a conductive material and a binder.

In some embodiments, a content of the cathode active material particles may be in a range from 85 weight percent (wt %) to 98 wt %, or from 90 wt % to 95 wt % based on a total weight of the cathode active material layer 110.

In some embodiments, a content of the conductive material may be in a range from 1 wt % to 10 wt %, or from 1 wt % to 5 wt % based on the total weight of the cathode active material layer 110.

In embodiments, an active material layer including the single particles may include a relatively larger amount (wt %) of the conductive material than an active material layer including the secondary particles. For example, a content of the conductive material included in the first active material layer 112 based on a total weight of the first active material layer 112 may be greater than a content the conductive material included in the second active material layer 114 based on a total weight of the second active material layer 114.

The conductive material may lower a resistance of the first active material layer 112 and may enhance electronic and ionic conductivities. Therefore, even though the first active material layer 112 includes the cathode active material particles having the form of the single particle, the cathode active material layer 110 having low resistance and high power may be implemented.

The second active material layer 114 including the cathode active material particles having the form of the secondary particle may include a relatively small amount (wt %) of the conductive material, so that the energy density and capacity properties of the cathode active material layer 110 may be improved.

In an embodiment, the content of the conductive material included in the first active material layer 112 based on the total weight of the first active material layer 112 may be in a range from 2 wt % to 10 wt %, or from 3 wt % to 5 wt %. In an embodiment, the content of the conductive material included in the second active material layer 114 based on the total weight of the second active material layer 114 may be in a range from 1 wt % to 5 wt %, or from 1 wt % to 3 wt %.

In an embodiment, the conductive material may include a linear-type conductive material or a dot-type conductive material (e.g., a spherical-type conductive material). For example, the linear-type conductive material may include a fibrous conductive material. The linear-type conductive material may form a conductive network in a wide range, and the dot-type conductive material may form a conductive network in a narrow range.

In some embodiments, an aspect ratio (length/diameter) of the linear-type conductive material may be in a range from 2 to 10,000, from 10 to 5,000, from 50 to 3,000, or from 100 to 1,000.

In some embodiments, the linear-type conductive material may include a carbon nanotube (CNT). For example, the linear-type conductive material may include a single-walled CNT (SWCNT), a double-walled CNT (DWCNT), a multi-walled CNT (MWCNT), a bundle-type CNT (rope CNT), and the like.

In some embodiments, a length of the linear-type conductive material may be in a range from 15 μm to 65 μm.

In some embodiments, an aspect ratio (length/diameter) of the dot-type conductive material may be in a range from 0.5 to 1.5.

In some embodiments, a sphericity of the dot-type conductive material may be in a range from 0.7 to 1, from 0.8 to 1, or from 0.9 to 1.

In some embodiments, a particle diameter ($D_{50}$) of the dot-type conductive material may be in a range from 10 nm to 100 nm, preferably from 10 nm to 60 nm, more preferably from 20 nm to 50 nm.

For example, the dot-type conductive material may include a carbon-based conductive material such as graphite, carbon black, graphene, carbon nanotube, and the like; and a metal-based conductive material such as tin, tin oxide, titanium oxide, $LaSrCoO_3$, $LaSrMnO_3$, and the like.

In an embodiment, the first active material layer 112 may include the linear-type conductive material and/or the dot-type conductive material, and the second active material layer 114 may include the linear-type conductive material.

In an embodiment, the first active material layer 112 including the single particles may include different types of the conductive materials. In this case, the conductivity of the single particles may be enhanced or supplemented. Further, even though the content of the binder in a region adjacent to the current collector increases, the reduction of conductivity may be suppressed.

Thus, a conductivity difference between the first active material layer 112 and the second active material layer 114 may be reduced, so that the internal resistance of the cathode active material layer 110 may be lowered, and high-rate charge/discharge performance may be further improved.

In some embodiments, an amount of the binder may be in a range from 1 wt % to 10 wt %, or from 1 wt % to 5 wt % based on the total weight of the cathode active material layer 110.

In embodiments, an active material layer (e.g., the first active material layer) adjacent to the current collector may include a relatively larger amount of binder than that in an active material layer (e.g., the second active material layer) located at an upper level. Accordingly, the content of the binder may be increased in a region adjacent to the current collector, and thus an adhesion between the cathode active material layer 110 and the cathode current collector 105 may be increased and the life-span properties of the secondary battery may be further improved.

For example, the binder may include an organic binder such as vinylidenefluoride-hexafluoropropylene copolymer (PVDF-co-HFP), polyvinylidenefluoride (PVDF), polyacrylonitrile, polymethylmethacrylate, etc.; and an aqueous binder such as styrene-butadiene rubber (SBR), and the like, and may also include a thickener such as carboxymethyl cellulose (CMC).

Figure 4:
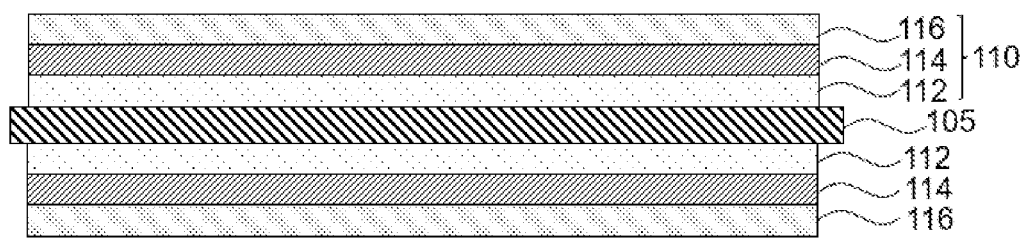
FIG. 4 is a schematic cross-sectional view of a cathode for a lithium secondary lithium battery in accordance with embodiments.

FIG. 4 is a schematic cross-sectional view of a cathode for a lithium secondary lithium battery in accordance with embodiments.

Referring to FIG. 4, the cathode 100 for a lithium secondary battery may have a multi-layered structure of three or more layers. For example, the cathode 100 may include a first active material layer 112, a second active material layer 114 and a third active material layer 116 sequentially formed from the cathode current collector 105.

The first active material layer 112, the second active material layer 114 and the third active material layer 116 may include different cathode active material particles. In an embodiment, the $D_A$ and $L_A$ values of each of the first active material layer 112, the second active material layer 114 and the third active material layer 116 may satisfy Equations 1 and 2 as described above.

In an embodiment, a density of the cathode active material layer may be in a range from 2.5 g/cc to 3.7 g/cc, from 2.8 g/cc to 3.7 g/cc, from 3.0 g/cc to 3.7 g/cc, from 3.2 g/cc to 3.7 g/cc, or from 3.5 g/cc to 3.7 g/cc.

For example, when the density of the cathode active material layer is greater than 3.7 g/cc, high-temperature stability may be deteriorated, and side reactions between the cathode active material and the electrolyte and gas generation may easily occur. The $D_A$ and $L_A$ of the cathode active material layer may be easily controlled within the above-described density range, and the high-temperature storage properties of the lithium secondary battery may be improved.

Lithium Secondary Battery

Figure 5:
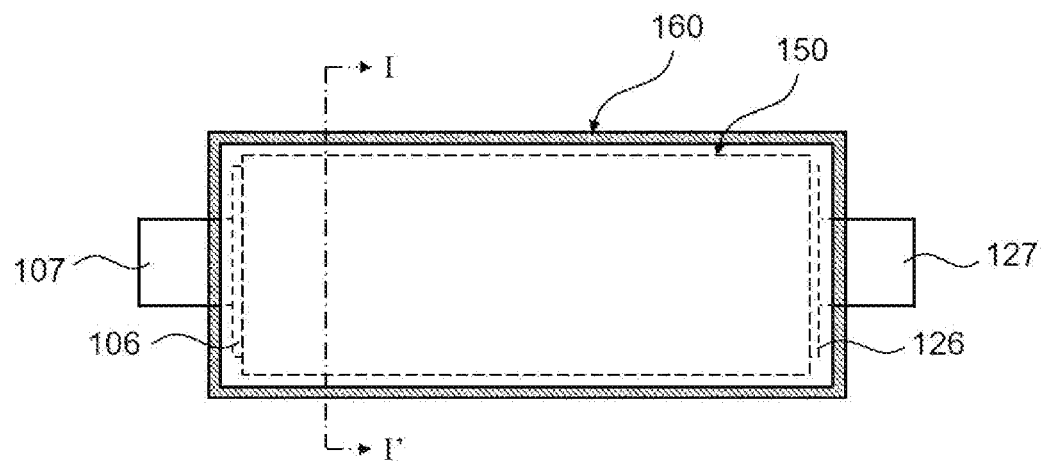
FIGS. 5 and 6 are a schematic plan view and a schematic cross-sectional view, respectively, of a lithium secondary battery in accordance with embodiments.
Figure 6:
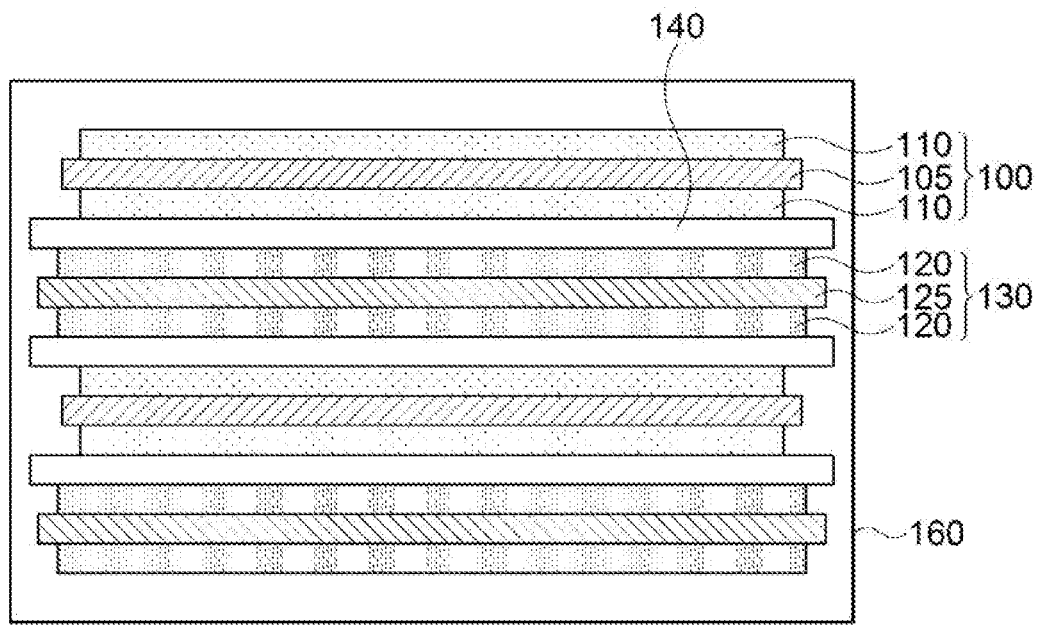

FIGS. 5 and 6 are a schematic plan view and a schematic cross-sectional view, respectively, of a lithium secondary battery in accordance with embodiments.

The lithium secondary battery may include the cathode 100 and an anode 130 facing the cathode 100.

The anode 130 may include an anode current collector 125 and an anode active material layer 120 formed on the anode current collector 125. For example, the anode active material layer 120 may be formed on one surface or both surfaces of the anode current collector 125.

For example, the anode active material layer 120 may include an anode active material. In an embodiment, the anode active material layer 120 may further include a binder, a conductive material, etc.

For example, the anode current collector 125 may include gold, stainless steel, nickel, aluminum, titanium, copper, or an alloy thereof.

The anode active material may be a material capable of intercalating and de-intercalating lithium ions. For example, the anode active material may include a lithium alloy, a carbon-based active material, a silicon-based active material, and the like. These may be used alone or in a combination thereof.

For example, the lithium alloy may include aluminum, zinc, bismuth, cadmium, antimony, silicon, lead, tin, gallium, indium, etc.

For example, the carbon-based active material may include crystalline carbon, amorphous carbon, a carbon composite, a carbon fiber, and the like.

For example, the amorphous carbon may include hard carbon, cokes, mesocarbon microbead, mesophase pitch-based carbon fiber, and the like.

For example, the crystalline carbon may include natural graphite, artificial graphite, graphitized cokes, graphitized MCMB, graphitized MPCF and the like.

In an embodiment, the anode active material may include the silicon-based active material. For example, the silicon-based active material may include Si, SiOx (0<x<2), Si/C, SiO/C, a Si-Metal, and the like. In this case, the lithium secondary battery having a high capacity may be implemented.

In some embodiments, an area of the anode 130 may be greater than an area of the cathode 100. Accordingly, transfer of lithium ions generated from the cathode 100 to the anode 130 may be facilitated without a precipitation.

For example, the cathode 100 and the anode 130 may be alternately repeated to form an electrode assembly 150.

In an embodiment, a separator 140 may be interposed between the anode 100 and the cathode 130. For example, the electrode assembly 150 may be formed by winding, stacking or z-folding of the separator 140.

The separator 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separator 140 may also include a non-woven fabric formed from a glass fiber with a high melting point, a polyethylene terephthalate fiber, or the like.

The lithium secondary battery according to embodiments may include a cathode lead 107 being connected to the cathode 100 and protruding to an outside of a case 160; and an anode lead 127 being connected to the anode 130 and protruding to an outside of the case 160.

The cathode lead 107 may be connected to the cathode current collector 105, and the anode lead 127 may be connected to the anode current collector 125.

The cathode current collector 105 may include a cathode tab 106 protruding from one side thereof. The cathode active material layer 110 may not be formed on the cathode tab 106. The cathode tab 106 may be integral with the cathode current collector 105 or may be connected by welding, etc. The cathode current collector 105 and the cathode lead 107 may be electrically connected via the cathode tab 106.

The anode current collector 125 may include an anode tab 126 protruding from one side thereof. The anode active material layer 120 may not be formed on the anode tab 126. The anode tab 126 may be integral with the anode current collector 125 or may be connected by welding, etc. The anode current collector 125 and the anode lead 127 may be electrically connected via the anode tab 126.

For example, the electrode assembly 150 and an electrolyte solution may be accommodated in the case 160 to form the lithium secondary battery.

The lithium secondary battery may be manufactured in, e.g., a cylindrical shape using a can, a square shape, a pouch shape or a coin shape.

In one embodiment, the electrolyte solution may include a lithium salt and an organic solvent.

In one embodiment, the lithium salt may include $Li^+X^-$. For example, the anion X- may be any one $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3$, $(CF_3SO_2)_2N^-$, $(FSO_2)_2N^-$, $CF_3CF_2(CF_3)_2CO^-$, $(CF_3SO_2)_2CH$, $(SF_5)_3C^-$, $(CF_3SO_2)_3C$, $CF_3(CF_2)_7SO_3$, $CF_3CO_2$, $CH_3CO_2^-$, $SCN^-$ and $(CF_3CF_2SO_2)_2N^-$.

In an embodiment, the organic solvent may include a carbonate-based solvent such as ethylene carbonate (EC), propylene carbonate (PC), dimethyl carbonate (DMC), diethyl carbonate (DEC), ethyl methyl carbonate (EMC), etc.; an ester-based solvent such as methyl propionate, ethyl propionate, ethyl acetate, propyl acetate, butyl acetate, butyrolactone, caprolactone, valerolactone, etc.; an ether-based solvent such as dibutyl ether, tetraethylene glycol dimethyl ether (TEGDME), diethylene glycol dimethyl ether (DEGDME), tetrahydrofuran (THF), etc.; an alcohol-based solvent such as ethyl alcohol, isopropyl alcohol, etc.; a ketone-based solvent such as cyclohexanone; an aprotic solvent such as an amide-based solvent (e.g., dimethylformamide), a dioxolane-based solvent (e.g., 1,3-dioxolane), a sulfolane-based solvent, a nitrile-based solvent, etc.

Hereinafter, embodiments are proposed to more concretely describe the present inventive concepts. However, the following examples are only given for illustrating the present invention and those skilled in the related art will obviously understand that various alterations and modifications are possible within the scope and spirit of the present disclosure. Such alterations and modifications are duly included in the appended claims.

Preparation Example 1 (Preparation of Single Particle A-1)

A mixed solution was prepared by adding $NiSO_4$, $CoSO_4$ and $MnSO_4$ in a molar ratio of 50:20:30 to distilled water from which internal dissolved oxygen was removed by bubbling with $N_2$ for 24 hours.

The mixed solution, NaOH and $NH_4OH$ were put into a reactor and a co-precipitation was performed for 60 hours to prepare metal hydroxide particles having the formula $Ni_{0.5}Co_{0.2}Mn_{0.3}(OH)_2$.

The metal hydroxide particles and lithium hydroxide were put into a dry high-speed mixer so that the molar ratio was 1:1.03.

The mixture was put into a firing furnace, a temperature of the furnace was raised to 950° C. at a ramping rate of 2° C./min, and the mixture was fired at 950° C. for 10 hours. During the firing, oxygen gas was passed through the firing furnace at a flow rate of 10 mL/min.

The fired product was naturally cooled to room temperature, and then pulverized and classified to obtain lithium metal oxide particles ($LiNi_{0.5}Co_{0.2}Mn_{0.3}O_2$).

A cross-section of the lithium metal oxide particle was observed with a scanning electron microscope (SEM) to confirm that the lithium metal oxide particle had a shape of a single particle.

A particle diameter ($D_{50}$) of the lithium metal oxide particles was measured using a laser diffraction method. The particle diameter ($D_{50}$) of the lithium metal oxide particles was 3.5 μm.

Preparation Example 2 (Preparation of Single Particle A-2)

Lithium metal oxide particles ($LiNi_{0.5}Co_{0.2}Mn_{0.3}O_2$) were obtained by the same method as that in Preparation Example 1, except that conditions of the pulverization and classification were changed to control the particle diameter ($D_{50}$).

A cross-section of the lithium metal oxide particle was observed with a scanning electron microscope (SEM) to confirm that the lithium metal oxide particle had a shape of a single particle.

A particle diameter ($D_{50}$) of the lithium metal oxide particles was measured using a laser diffraction method. The particle diameter ($D_{50}$) of the lithium metal oxide particles was 10 μm.

Preparation Example 3 (Preparation of Secondary Particle A-3)

A mixed solution was prepared by adding $NiSO_4$, $CoSO_4$ and $MnSO_4$ in a molar ratio of 50:20:30 to distilled water from which internal dissolved oxygen was removed by bubbling with $N_2$ for 24 hours.

The mixed solution, NaOH and $NH_4OH$ were put into a reactor, and co-precipitation was performed for 55 hours to prepare metal hydroxide particles having the formula $Ni_{0.5}Co_{0.2}Mn_{0.3}(OH)_2$.

The metal hydroxide particles and lithium hydroxide were put into a dry high-speed mixer so that the molar ratio was 1:1.03.

The mixture was put into a firing furnace, and a temperature of the furnace was raised to 700° C. at a ramping rate of 2° C./min, and maintained at 700° C. for 15 hours. During the firing, oxygen gas was passed through the firing furnace at a flow rate of 10 mL/min.

The fired product was naturally cooled to room temperature, and then pulverized and classified to obtain lithium metal oxide particles of the formula $LiNi_{0.5}Co_{0.2}Mn_{0.3}O_2$.

A cross-section of the lithium metal oxide particle was observed with a scanning electron microscope (SEM) to confirm that the lithium metal oxide particle had a form of a secondary particle including primary particles aggregated therein.

The particle diameter ($D_{50}$) of the lithium metal oxide particles was measured using a laser diffraction method. The particle diameter ($D_{50}$) of the lithium metal oxide particles was 9.6 μm.

Preparation Example 4 (Preparation of Secondary Particle A-4)

Lithium metal oxide particles ($LiNi_{0.5}Co_{0.2}Mn_{0.3}O_2$) were obtained by the same method as that in Preparation Example 3, except that conditions of the pulverization and classification were changed to control the particle diameter ($D_{50}$).

A cross-section of the lithium metal oxide particle was observed with a scanning electron microscope (SEM) to confirm that the lithium metal oxide particle had a form of a secondary particle including primary particles aggregated therein.

The particle diameter ($D_{50}$) of the lithium metal oxide particles was measured using a laser diffraction method. The particle diameter ($D_{50}$) of the lithium metal oxide particles was 5 μm.

Examples and Comparative Examples 1 to 6

A first cathode slurry was prepared by dispersing a first cathode active material shown in Table 1, PVDF and a conductive material in N-Methyl-2-pyrrolidone (NMP) at a weight ratio of (97-x):3:x. A mixture of MWCNTs (length: 30 μm) and carbon black (sphericity>0.8, D50: 35 nm) in a weight ratio of 5:5 was used as the conductive material. The first cathode slurry was coated on an aluminum foil (thickness: 15 μm), and dried to form a first active material layer. In Example 4, only carbon black (sphericity>0.8, D50: 35 nm) was used as the conductive material.

A second cathode slurry was prepared by dispersing a second cathode active material shown in Table 1, PVDF and MWCNTs (length: 30 μm) in NMP in a weight ratio of (97-y):3:y. The second cathode slurry was coated on the first active material layer and dried to form a second active material layer.

Thereafter, the first and second active material layers were pressed so that a density of each cathode active material layer became from about 3.5 g/cc to 3.7 g/cc to form a cathode. In Comparative Example 5, the pressing was performed so that the density of each cathode active material layer was about 3.4 g/cc.

A lithium metal was used as a counter electrode (anode).

The cathode and the anode were each notched in a circular shape, and a circular polyethylene separator (thickness: 13 μm) was interposed between the cathode and the anode to prepare an electrode assembly.

The electrode assembly was placed in a coin-shaped casing, and an electrolyte was injected to prepare a coin-type lithium secondary battery.

As the electrolyte, 1M $LiPF_6$ solution in a mixed solvent of EC/EMC (30:70 v/v) was used.

Comparative Example 7

The first cathode active material and the second cathode active material shown in Table 1 below were mixed. The mixed cathode active material, PVDF and a conductive material were dispersed in NMP in a weight ratio of 92:3:5 to form a cathode slurry. A mixture of MWCNTs (length: 30 μm) and carbon black (sphericity>0.8, D50: 35 nm) in a weight ratio of 5:5 was used as the conductive material.

The cathode slurry was coated on an aluminum foil (thickness: 15 μm), and dried to form a cathode active material layer having a single-layered structure, and the cathode active material layer was pressed to prepare a cathode.

A lithium metal was used as a counter electrode (anode).

The cathode and the anode were each notched in a circular shape, and a circular polyethylene separator (thickness of 13 μm) was interposed between the cathode and the anode to prepare an electrode assembly.

The electrode assembly was placed in a coin-shaped casing, and an electrolyte was injected to prepare a coin-type lithium secondary battery.

As the electrolyte, 1M $LiPF_6$ solution in a mixed solvent of EC/EMC (30:70 v/v) was used.

TABLE 1

| No. | first cathode active material | second cathode active material | content of conductive material | |
|---|---|---|---|---|
| | | | first active material layer (x) | second active material layer (y) |
| Example 1 | A-1 | A-3 | 5 | 3 |
| Example 2 | A-1 | A-4 | 5 | 3 |
| Example 3 | A-1 | A-3 | 3 | 5 |
| Example 4 | A-1 | A-4 | 3 | 6 |
| Comparative Example 1 | A-2 | A-3 | 5 | 3 |
| Comparative Example 2 | A-2 | A-4 | 5 | 3 |
| Comparative Example 3 | A-3 | A-1 | 5 | 3 |
| Comparative Example 4 | A-3 | A-3 | 5 | 3 |
| Comparative Example 5 | A-1 | A-3 | 5 | 3 |
| Comparative Example 6 | A-4 | A-1 | 5 | 2 |
| Comparative Example 7 | A-1 | A-3 | 5 | |

Evaluation Example 1: Evaluation of Percolation Path in Cathode Active Material Layer (1) Samples were prepared by cutting each of the cathode active material layers of Examples and Comparative Examples into a size of 100 mm×100 mm.

(2) A 3D model representing a distribution of the cathode active material particles in the sample was prepared (only the cathode active material particles were targeted).

(3) In the 3D model, paths extending between the cathode active material particles and passing through both sides of the 3D model in a thickness direction were analyzed.

(4-1) For each of the paths, a diameter of the largest sphere (sphericity 1) capable of passing through the path was measured. After arranging the measured diameters in a descending order, an average ($D_A$) of top 100 diameters was calculated.

(4-2) After arranging the paths in a descending order of the measured diameters, an average ($L_A$) of lengths of top 100 paths was calculated.

The above-described analysis of the sample was conducted using the following equipment and conditions.

i) Measuring equipment: X-ray microscope (XRM; Zeiss, 620 versa)

ii) Measurement conditions: Source condition 50 kV, 4.5 W, Voxel size: 300 nm iii) Analysis equipment and program: Material Characterization by MATDICT and GeoDict™ S/W.

iv) Analysis condition: Computation direction of percolation path was set to a thickness direction (Z-direction)

(5) The percolation path for each of the first active material layer and the second active material layer was measured. In Table 2 below, $D_A$ of the first active material layer is represented as $D_{A1}$, $D_A$ of the second active material layer is represented as $D_{A2}$, $L_A$ of the first active material layer is represented as $L_{A1}$, and $L_A$ of the second active material layer is represented as $L_{A2}$.

TABLE 2

| No. | first active material layer | | second active material layer | | | |
|---|---|---|---|---|---|---|
| | $D_{A1}$ (μm) | $L_{A1}$ (μm) | $D_{A2}$ (μm) | $L_{A2}$ (μm) | $D_{A2}/D_{A1}$ | $L_{A2}/L_{A1}$ |
| Example 1 | 0.43 | 65.14 | 1.72 | 56.36 | 4.01 | 0.87 |
| Example 2 | 0.43 | 65.14 | 0.53 | 64.42 | 1.25 | 0.99 |
| Example 3 | 0.35 | 65.14 | 1.72 | 56.36 | 4.92 | 0.87 |
| Example 4 | 0.30 | 65.14 | 0.60 | 64.42 | 2.00 | 0.99 |
| Comparative Example 1 | 1.81 | 55.78 | 1.72 | 56.36 | 0.95 | 1.01 |
| Comparative Example 2 | 1.81 | 55.78 | 0.53 | 64.42 | 0.30 | 1.15 |
| Comparative Example 3 | 1.72 | 56.36 | 0.43 | 65.14 | 0.25 | 1.16 |
| Comparative Example 4 | 1.72 | 56.36 | 1.72 | 56.36 | 1.00 | 1.00 |
| Comparative Example 5 | 0.52 | 71.65 | 2.06 | 62.00 | 3.96 | 0.87 |
| Comparative Example 6 | 0.53 | 65.14 | 0.30 | 65.14 | 0.56 | 1.01 |
| Comparative Example 7 | 0.60 | 65.14 | — | — | — | — |

Evaluation Example 2: Direct Current Internal Resistance (DCIR) Measurement

For the lithium secondary battery according to each of Examples and Comparative Examples, end points of voltage were constructed in a equation of a straight line while increasing a C-rate sequentially by 0.2 C, 0.5 C, 1.0 C, 1.5 C, 2.0 C, 2.5 C and 3.0 C at an SOC (State of Charge) 60% point and performing charging/discharging at each C-rate for 10 seconds. A slope of the equation of the straight line was adopted as a DCIR.

Evaluation Example 3: Evaluation on Power Property

A power property at SOC 50% was measured using a hybrid pulse power characterization by FreedomCarBattery Test Manual (HPPC) method for the lithium secondary battery according to each of Examples and Comparative Examples. The evaluation results are shown in Table 3 below.

Evaluation Example 4: Evaluation on Life-Span Property

After repeating charging (CC-CV 1.0 C 4.2V 0.1 C CUT-OFF) and discharging (CC 1.0 C 2.5V CUT-OFF) 300 times for the lithium secondary battery according to each of Examples and Comparative Examples, a direct current internal resistance (DCIR) was measured by same method as that in Evaluation Example 2. A DCIR after the 300 charge/discharge cycles was converted as a percentage relative to the DCIR in the first cycle.

Evaluation Example 5: Evaluation on Rapid Charging Property

The lithium secondary battery according to each of Examples and Comparative Examples was charged (CC-CV 4.1V 5.0 C SOC80% cut-off), left for 10 minutes, discharged (CC 1/3 C 2.5V cut-off), and then left for 10 minutes. The above processes were set as one cycle, and 200 cycles were performed. An SOH (State of Health) was evaluated by calculating the discharge capacity after the 200 cycles relative to an initial discharge capacity.

The evaluation results are shown in Table 3 below.

TABLE 3

| No. | DCIR (mohm) | power property (W/kg) | DCIR ratio (%, @300 cycle) | rapid charging SOH (% @200Cycle) |
|---|---|---|---|---|
| Example 1 | 1.079 | 2647.2 | 109.0 | 95.0 |
| Example 2 | 1.143 | 2583.1 | 115.4 | 93.1 |
| Example 3 | 1.108 | 2607.6 | 112.3 | 94.1 |
| Example 4 | 1.129 | 2598.4 | 113.2 | 93.8 |
| Comparative Example 1 | 1.325 | 2401.0 | 133.8 | 87.6 |
| Comparative Example 2 | 1.312 | 2414.0 | 132.5 | 88.0 |
| Comparative Example 3 | 1.261 | 2465.0 | 127.4 | 89.5 |
| Comparative Example 4 | 1.252 | 2474.0 | 126.5 | 89.8 |
| Comparative Example 5 | 1.230 | 2497.1 | 120.7 | 91.8 |
| Comparative Example 6 | 1.342 | 2402.1 | 133.5 | 87.0 |
| Comparative Example 7 | 1.241 | 2485.0 | 125.3 | 90.1 |

Referring to Tables 2 and 3, in the secondary batteries of Examples having a $D_A$ of the first active material layer of 0.5 μm or less provided improved electrochemical properties compared to those from the secondary batteries of Comparative Examples.

The secondary batteries of Comparative Examples had the same composition of the cathode active material as that in Examples, but $D_A$ and $L_A$ of the cathode active material layer did not satisfy the above-described ranges to provide deteriorated electrochemical properties. For example, even though the composition of the cathode active material, other slurry compositions, the density or thickness of the active material layer were identical, the cathode active material layer in which $D_A$ and $L_A$ were not within the above range provided degraded electrochemical properties.

In Comparative Example 7 where the cathode active material layer had a single-layered structure, the internal resistance, power property and rapid charging property were relatively deteriorated, and the life-span property was also deteriorated.

What is claimed is:

1. A cathode for a lithium secondary battery, comprising:
a cathode current collector; and
a cathode active material layer comprising a plurality of active material layers sequentially disposed on the cathode current collector which include different types of cathode active material particles from each other,
wherein an active material layer closest to the cathode current collector among the plurality of active material layers has a $D_A$ of 0.5 μm or less,
wherein, in a 3D model of each active material layer showing a distribution of the cathode active material particles included in each active material layer, $D_A$ is an arithmetic average value of top 100 diameters of spheres when paths extending between the cathode active material particles and passing through both surfaces of the 3D model in a thickness direction are analyzed, a maximum diameter of a sphere capable of passing through each path is measured, and the diameters of the spheres are listed in a descending order.

2. The cathode for a lithium secondary battery according to claim 1, wherein the cathode active material layer satisfies Equation 1 below:

$$0 \leq |D_{A1} - D_{A2}|/D_{A1} \leq 4.4 \quad \text{Equation 1}$$

wherein, in Equation 1, $D_{A1}$ and $D_{A2}$ are $D_A$ values of active material layers neighboring each other among the plurality of active material layers.

3. The cathode for a lithium secondary battery according to claim 1, wherein the cathode active material layer comprises:
a first active material layer on the cathode current collector, the first active material layer including first cathode active material particles and having a $D_A$ of 0.5 μm or less; and
a second active material layer on the first active material layer, the second active material layer including second cathode active material particles different from the first cathode active material particles.

4. The cathode for a lithium secondary battery according to claim 3, wherein the $D_A$ of the first active material layer is in a range from 0.3 μm to 0.5 μm.

5. The cathode for a lithium secondary battery according to claim 3, wherein a $D_A$ of the second active material layer is in a range from 0.5 μm to 2 μm.

6. The cathode for a lithium secondary battery according to claim 3,
wherein the $D_A$ of the first active material layer is less than or equal to a $D_A$ of the second active material layer.

7. The cathode for a lithium secondary battery according to claim 3, wherein a ratio of a $D_A$ of the second active material layer relative to the $D_A$ of the first active material layer is in a range from 1 to 5.

8. The cathode for a lithium secondary battery according to claim 3, wherein a $L_A$ of the first active material layer is 60 μm or more,
wherein, in a 3D model of each active material layer showing a distribution of the cathode active material particles included in each active material layer, $L_A$ is an arithmetic average value of lengths of top 100 paths when paths extending between the cathode active material particles and passing through both surfaces of the 3D model in a thickness direction are analyzed, a maximum diameter of a sphere capable of passing through each path is measured, and the paths are listed in a descending order of the diameters of the spheres.

9. The cathode for a lithium secondary battery according to claim 8, wherein the $L_A$ of the first active material layer is in a range from 60 μm to 70 μm.

10. The cathode for a lithium secondary battery according to claim 8, wherein a $L_A$ of the second active material layer is 65 μm or less.

11. The cathode for a lithium secondary battery according to claim 8, wherein the $L_A$ of the first active material layer is greater than or equal to a $L_A$ of the second active material layer.

12. The cathode for a lithium secondary battery according to claim 8, wherein a ratio of a $L_A$ of the second active material layer relative to the $L_A$ of the first active material layer is in a range from 0.8 to 1.0.

13. The cathode for a lithium secondary battery according to claim 3, wherein the first cathode active material particles have a shape of a single particle, and the second cathode active material particles have a shape of a secondary particle in which a plurality of primary particles are aggregated.

14. The cathode for a lithium secondary battery according to claim 3, wherein an average particle diameter $D_{50}$ of the first cathode active material particles is smaller than an average particle diameter $D_{50}$ of the second cathode active material particles.

15. The cathode for a lithium secondary battery according to claim 14, wherein the average particle diameter $D_{50}$ of the first cathode active material particles is in a range from 1 μm to 7 μm, and the average particle diameter $D_{50}$ of the second cathode active material particles is in a range from 9 μm to 20 μm.

16. The cathode for a lithium secondary battery according to claim 1, wherein the cathode active material layer further includes a conductive material and a binder, and a content of the cathode active material particles is in a range from 85 wt % to 98 wt % based on a total weight of the cathode active material layer.

17. The cathode for a lithium secondary battery according to claim 1, wherein a density of the cathode active material layer is in a range from 3.5 g/cc to 3.7 g/cc.

18. A lithium secondary battery, comprising:
the cathode for a lithium secondary battery of claim 1; and
an anode facing the cathode.

19. A cathode for a lithium secondary battery, comprising:
a cathode current collector; and
a plurality of active material layers stacked over the cathode current collector, wherein at least two of the plurality of the active material layers comprise different cathode active material particles,
wherein an active material layer which is in contact with the cathode current collector has a $D_A$ of 0.5 μm or less,
wherein, in a 3D model of each active material layer showing a distribution of the cathode active material particles included in each active material layer, $D_A$ is an arithmetic average value of top 100 diameters of spheres when paths extending between the cathode active material particles and passing through both surfaces of the 3D model in a thickness direction are analyzed, a maximum diameter of a sphere capable of passing through each path is measured, and the diameters of the spheres are listed in a descending order.

\* \* \* \* \*